United States Patent
Grinderslev (10) Patent No.: US 9,470,847 B2
(45) Date of Patent: Oct. 18, 2016

(54) POLARIZATION MAINTAINING CONNECTORS

(71) Applicant: Tyco Electronics Corporation, Berwyn, PA (US)

(72) Inventor: Soren Grinderslev, Hummelstown, PA (US)

(73) Assignee: TYCO ELECTRONICS CORPORATION, Berwyn, PA (US)

( * ) Notice: Subject to any disclaimer, the term of this patent is extended or adjusted under 35 U.S.C. 154(b) by 317 days.

(21) Appl. No.: 14/295,606

(22) Filed: Jun. 4, 2014

(65) Prior Publication Data

US 2016/0202428 A1  Jul. 14, 2016

(51) Int. Cl.
G02B 6/38 (2006.01)
G02B 6/27 (2006.01)

(52) U.S. Cl.
CPC ............ *G02B 6/3812* (2013.01); *G02B 6/387* (2013.01); *G02B 6/3821* (2013.01); *G02B 6/3831* (2013.01); *G02B 6/3882* (2013.01); *G02B 6/2793* (2013.01); *G02B 6/3843* (2013.01); *G02B 6/3851* (2013.01); *G02B 6/3871* (2013.01)

(58) Field of Classification Search
CPC G02B 6/3812; G02B 6/3821; G02B 6/3831; G02B 6/387; G02B 6/3882; G02B 6/3851; G02B 6/3843; G02B 6/3871; G02B 6/2793
USPC ..................................................... 385/53–94
See application file for complete search history.

(56) References Cited

U.S. PATENT DOCUMENTS

| | | | | |
|---|---|---|---|---|
| 5,216,733 A * | 6/1993 | Nagase | ................ | G02B 6/3812 385/11 |
| 5,335,301 A * | 8/1994 | Newman | ............... | G02B 6/3831 385/139 |
| 5,682,451 A * | 10/1997 | Lee | ....................... | G02B 6/3812 385/56 |
| 6,619,856 B1 * | 9/2003 | Lampert | .............. | G02B 6/3812 385/59 |
| 6,705,765 B2 * | 3/2004 | Lampert | .............. | G02B 6/3821 385/77 |
| 6,744,939 B2 * | 6/2004 | Lampert | .............. | G02B 6/3812 385/11 |
| 6,895,654 B2 * | 5/2005 | Strandberg | .......... | G02B 6/3812 29/33 F |
| 6,913,392 B2 * | 7/2005 | Grzegorzewska | ... | G02B 6/3869 385/60 |
| 6,945,703 B2 * | 9/2005 | Hayasaka | ........... | G02B 6/3894 385/60 |
| 7,052,188 B2 * | 5/2006 | Manning | ............. | G02B 6/3812 385/56 |
| 7,118,286 B2 * | 10/2006 | Gurreri | ................ | G02B 6/3831 385/58 |

(Continued)

*Primary Examiner* — Thomas A Hollweg
*Assistant Examiner* — Guy Anderson (57) ABSTRACT

A connector comprising an outer housing having a first keying element, an inner housing at least partially disposed in the outer housing and having second and third keying elements, the second keying element cooperating with the first keying element to align angularly the inner housing with the outer housing, a ferrule assembly at least partially disposed in the inner housing and having a ferrule and fourth and fifth keying elements, the fourth keying element cooperating with the third keying element to align angularly the ferrule assembly with the inner housing, an alignment member receiving at least a portion of the ferrule assembly, the alignment member having a sixth keying element to cooperate with the fifth keying element to align angularly the ferrule assembly with the alignment member, and wherein the clearance between the fifth and sixth keying elements is less than that between the first and second keying elements, and between the third and fourth keying elements.

23 Claims, 4 Drawing Sheets

(56) References Cited

U.S. PATENT DOCUMENTS

| | | | | |
|---|---|---|---|---|
| 7,182,523 B2 * | 2/2007 | Abendschein | G02B 6/3831 | 385/56 |
| 7,245,799 B2 * | 7/2007 | Shull | G02B 6/32 | 385/23 |
| 7,387,446 B2 * | 6/2008 | Greub | G02B 6/3812 | 385/60 |
| 7,553,089 B2 * | 6/2009 | Gurreri | G02B 6/3831 | 385/60 |
| 8,961,031 B2 * | 2/2015 | Gurreri | G02B 6/3831 | 385/58 |
| 2003/0009869 A1 * | 1/2003 | Strandberg | G02B 6/3812 | 29/407.01 |
| 2003/0161586 A1 * | 8/2003 | Hirabayashi | G02B 6/3869 | 385/78 |
| 2003/0215171 A1 * | 11/2003 | Lampert | G02B 6/3812 | 385/11 |
| 2003/0215190 A1 * | 11/2003 | Lampert | G02B 6/3821 | 385/77 |
| 2004/0028343 A1 * | 2/2004 | Hayasaka | G02B 6/3894 | 385/60 |
| 2004/0101254 A1 * | 5/2004 | Erdman | G02B 6/3871 | 385/78 |
| 2004/0131316 A1 * | 7/2004 | Manning | G02B 6/3812 | 385/78 |
| 2005/0084215 A1 * | 4/2005 | Grzegorzewska | G02B 6/3869 | 385/60 |
| 2005/0238289 A1 * | 10/2005 | Shull | G02B 6/32 | 385/53 |
| 2006/0018603 A1 * | 1/2006 | Greub | G02B 6/3812 | 385/60 |
| 2007/0217747 A1 * | 9/2007 | Greub | G02B 6/3812 | 385/60 |
| 2007/0292084 A1 * | 12/2007 | Gurreri | G02B 6/3831 | 385/78 |
| 2013/0266279 A1 * | 10/2013 | Nishioka | G02B 6/3851 | 385/99 |
| 2014/0219610 A1 * | 8/2014 | Gurreri | G02B 6/3831 | 385/58 |

* cited by examiner

POLARIZATION MAINTAINING CONNECTORS

FIELD OF INVENTION

The present invention relates generally to polarization maintaining connectors, and, more particularly to ruggedized optical connectors for polarization maintaining fibers.

BACKGROUND OF INVENTION

Optical fiber connectors are a critical part of essentially all optical fiber communication systems. For instance, such connectors are used to join segments of fiber into longer lengths, to connect fiber to active devices, such as radiation sources, detectors and repeaters, and to connect fiber to passive devices, such as switches, multiplexers, and attenuators. The principal function of an optical fiber connector is to hold the fiber end such that the fiber's core is axially aligned with an optical pathway of the mating structure. This way, light from the fiber is optically coupled to the optical pathway.

A light wave propagating in a standard single mode fiber has a fundamental propagation mode (TEM00), which is a combination of two, orthogonally-polarized modes travelling at the same velocity with a common refractive index for both modes due to material symmetry of the glass fiber. Theoretically, these two modes are functionally identical, however, any deviation from a straight non-stressed fiber having perfect geometry will cause interaction and cross coupling between the two propagating modes. This cross coupling occurs when the fiber is exposed to thermal or physical influences which introduce local refractive index changes resulting in interchange of energy between the propagating modes. Considering that the speed of light in a PM fiber is inversely proportional with the magnitude of the refractive index (n), even small fiber disturbances can cause polarization variations. Thus, for any practical setup outside of a controlled laboratory environment, use of a regular single mode fiber will result in an uncontrolled energy cross coupling between the modes, an effect which is called birefringence. The refractive indices for the two modes will vary depending on the level of the induced stress causing a random mode propagation with different phase velocities. This modal energy transfer—crosstalk—results in a random state of polarization exiting the fiber and a pulse broadening called Polarization Mode Dispersion (PMD).

For certain applications, it is advantageous to use fibers designed with built-in birefringence which have the ability to maintain the linear polarization and preserve it even if the fiber is exposed to (limited) mechanical stress or external thermal influences. These are called polarization maintaining (PM) fibers. PM fibers maintain a stable polarization state in single mode optical transmission. The main applications for PM optical fibers are in sensors, interferometers and optical gyroscopes. They are also used frequently in telecommunication as a connection between a laser and an E/O modulator which requires an optical polarized input. Short fiber lengths are preferred due to the relative high cost of PM cables but also because they tend to have higher attenuation than regular single mode fibers.

There are three (3) main PM fiber types—namely, the 'Panda' fiber, the 'butterfly' or 'bowtie' fiber and the oval PM fiber. Each type has high expansion glass stress members arranged symmetrically in relationship to the fiber core. During cooling at the fiber drawing process, these stress members shrink slightly more than the surrounding glass and will cause a permanent tension on the core material. This directionally controlled tension induces birefringence, which means that two different indices of refraction are created in the fiber in directions substantially perpendicular to each other. The more birefringence that is generated, the more stress is applied to the core, and the larger the velocity difference is between the two modes, and the more difficult it is to induce cross-coupling via external stress applications. The axis of the applied stress—namely the slow axis—results in a higher refractive index than that created perpendicular to the stress application. Therefore, if linear polarized light is launched into the fiber in the same plane as the slow axis it will travel at a lower velocity (n high) than if it had been launched into the perpendicular plane of the fast axis (n low). Because of the difference in propagation velocity, the energy cross-coupling between the modes is prevented and the polarization state of the light wave is preserved.

The polarization maintaining ability of a PM fiber can be established by measuring the polarization extinction ratio (PER). This property is defined as 10 times the logarithm of the maximum intensity along the direction of the polarization divided by the minimum intensity of the component in the orthogonal direction. The unit of the PER calculation is expressed in dB.

$$PER = 10 \cdot \log\left(\frac{P\max}{P\min}\right)$$

PM fibers with high birefringence can sustain more than a 30 dB polarization extinction ratio. In other words, the intensity of light in the first axis has approximately 1,000 times more energy than that of the perpendicular axis having minimum intensity.

Interconnection of PM fibers requires a connector technology that is able to align not only the fiber cores to realize low mating loss, but also the polarization axes of the fibers to achieve a precise angular alignment of the mated polarization planes. This is necessary to avoid cross-coupling and a degradation of the extinction ratio. Specifically, a sensitivity analysis of the PER dependence can be done geometrically by use of the misalignment angle θ between the two mated slow axis.

$$PER = 10 \log(\tan^2 \theta)$$

Figure 2:
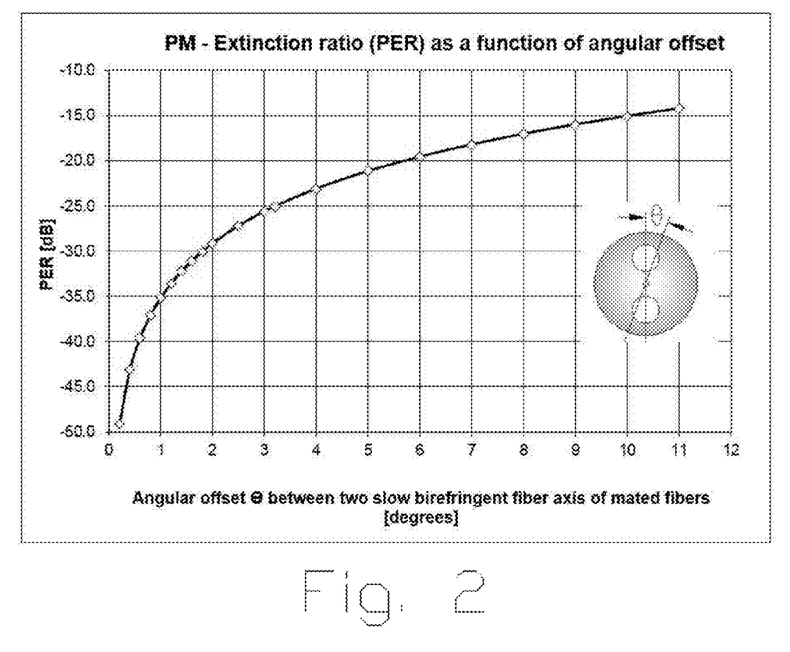
FIG. 2 shows the extinction ratio (PER) as a function of angular offset of PM axes in mated fibers.

Here θ is the misalignment angle between two polarization angles of the mated fibers. The PER function of the angular offset is shown graphical in FIG. 2. This graph can be used as a quick reference to determine the maximum misalignment angle allowed for a certain PER level. When the angle is known, calculations can be made to establish the mechanical tolerances needed to achieve the targeted design objective. For example, to sustain a PER of 30 dB or better, across the optical interface, the mechanical tolerance between the fiber polarization axis must be less than 1.8 degrees.

Therefore, a need exists for an optical connector that precisely aligns the PM fibers to reduce angular offset such that the extinction ratio is minimized. The present invention fulfills this need, among others.

SUMMARY OF INVENTION

The following presents a simplified summary of the invention in order to provide a basic understanding of some aspects of the invention. This summary is not an extensive overview of the invention. It is not intended to identify key/critical elements of the invention or to delineate the scope of the invention. Its sole purpose is to present some concepts of the invention in a simplified form as a prelude to the more detailed description that is presented later.

The present invention relates to a connector in which the polarization axis of the PM fiber is aligned to a keying element of a connector, such that similar connectors can mate with minimal angular offset. In one embodiment, different components of the connector are keyed with difference clearances, leading to very tightly toleranced keying at the ferrule containing the PM fiber to minimize angular offset. More specifically, the outer components of the connector have one or more relatively rough keying mechanisms, which align the components sufficiently such that a finer keying mechanism associated with the ferrule can engage and thereby align the PM fibers. This way, the coarse keying mechanisms serve to "pre-align" the components, and facilitate the interengagement of the finer keying elements to precisely align the ferrule within the connector.

Accordingly, in one embodiment, the connector comprises (a) an outer housing having a first keying element; (b) an inner housing at least partially disposed in the outer housing and having second and third keying elements, the second keying element cooperating with the first keying element to align angularly the inner housing with the outer housing; (c) a ferrule assembly at least partially disposed in the inner housing and having a ferrule and fourth and fifth keying elements, the fourth keying element cooperating with the third keying element to align angularly the ferrule assembly with the inner housing; (d) an alignment member receiving at least a portion of the ferrule assembly, the alignment member having a sixth keying element to cooperate with the fifth keying element to align angularly alignment member with the ferrule assembly; and (e) wherein the clearance between the fifth and sixth keying elements is tighter than that between the first and second keying elements, and between the third and fourth keying elements.

In another embodiment, the connector comprises (a) a housing having a first keying element; (b) a ferrule assembly at least partially disposed in the housing, and comprising a ferrule and having second and third keying elements, the second keying element cooperating with the first keying element to align angularly the ferrule assembly with the inner housing; (c) an alignment member receiving at least a portion of the ferrule assembly, the alignment member having a fourth keying element to cooperate with the third keying element to align angularly the ferrule assembly with the alignment member; and (d) wherein the clearance between the third and fourth keying elements is tighter than that between the first and second keying elements.

DETAILED DESCRIPTION

Figure 1A:
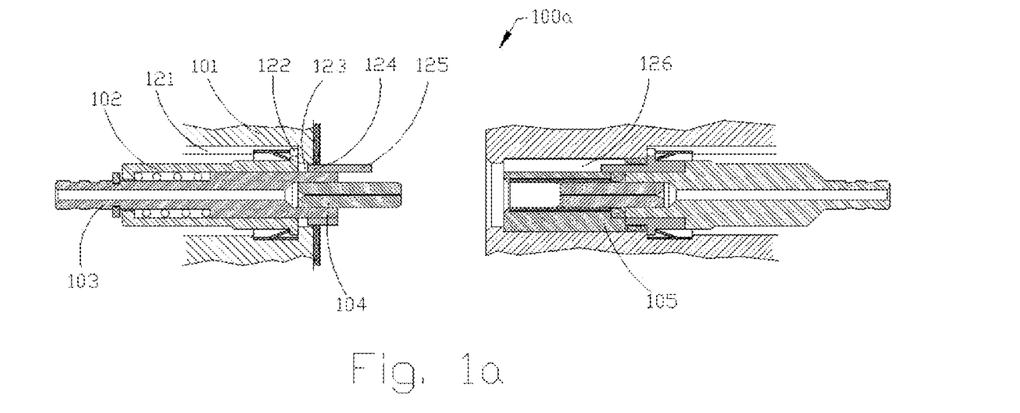
FIGS. 1a and 1b show one embodiment of the connector of the present invention in a unmated and mated configuration, respectively.
Figure 1B:
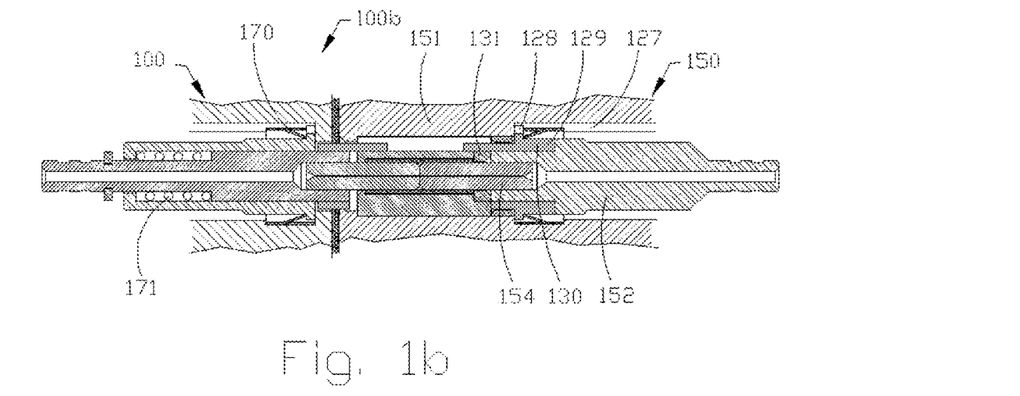

Referring to FIGS. 1a and 1b, one embodiment of the connector 100 in its unmated and mated state, 100a, 100b, respectively, is shown. The connector 100 comprises an outer housing 101 having a first keying element 121, and an inner housing 102 at least partially disposed in the outer housing 101. The inner housing comprises second and third keying elements, 122, 123. The second keying element 122 cooperates with the first keying element 121 to align angularly the inner housing 102 within the outer housing 101. The connector also comprises a ferrule assembly 103 at least partially disposed in the inner housing 102 and having a ferrule 104 and fourth and fifth keying elements 124, 125. The fourth keying element 124 cooperates with the third keying element 123 to align angularly the ferrule assembly 103 with the inner housing 102. The connector also comprises an alignment member 105 receiving at least a portion of the ferrule 104. The alignment member 105 has a sixth keying element 126 to cooperate with the fifth keying element 125 to align angularly the ferrule 104 with the alignment member. To reduce angular offset, in one embodiment, the clearance between the fifth and sixth keying elements 125, 126 is tighter than that between the first and second keying elements 121, 122, and between the third and fourth keying elements 123, 124.

The present invention relates to a connector in which different components of the connector are keyed with difference tolerances, leading to very tightly toleranced keying at the ferrule containing a PM fiber to minimize angular offset. More specifically, the outer components of the connector have one or more relatively rough keying mechanisms, which align the components sufficiently such that a finer keying mechanism associated with the ferrule can engage and thereby align the PM fibers. This way, the coarse keying mechanisms serve to pre-align the components, and facilitate the interengagement of the finer keying elements to precisely align the ferrule within the connector.

As used in this application, the keying elements may be one of either the key or the keyway depending upon the application. For example, in the embodiment shown in FIG. 1a, the first keying element 121 is a keyway, while the second keying element 122 is the key. Alternatively, it is within the scope of the claims that the first keying element may be a key while the second keying element is the keyway.

In the embodiment of FIGS. 1a and 1b, three different keying mechanisms are used. The first mechanism is between the outer housing and the inner housing. Specifically, the first and second keying elements 121, 122 cooperate to angularly align the inner housing 102 with the outer housing 101. In this embodiment, the first keying element 121 is a keyway and the second keying element 122 is a key. Such a keying mechanism is generally well-known and is standard in a number of connectors including, for example, the MIL38999 type connector. The second keying mechanism is between the inner housing 102 and the ferrule assembly 103. Specifically, the third and fourth keying elements 123, 124 cooperate to angularly align the ferrule assembly 103 with the inner housing 102. Again, which of the second and third keying elements is the key or the keyway is not critical. In the embodiment shown in FIGS. 1a and 1b, the third keying element 123 is a keyway while the fourth keying element 124 is a key. The third and final keying mechanism in this embodiment is the fine keying mechanism. The key and the keyway in this keying mechanism are closely toleranced such that there is very little movement angularly between the key and the keyway. In one embodiment, the clearance is no greater than about 37 microns. In this way, the ferrule is held in close angular alignment within the alignment member 105. By holding the ferrule 104 in precise angular alignment within the alignment member 105, it can mate precisely with little angular offset with a second, similarly configured ferrule 154 received in the same alignment member as shown in FIG. 1b.

In the embodiment of FIGS. 1a and 1b, the three keying mechanisms have varying tolerance. Specifically, the first keying mechanism (first and second keying elements 121, 122) is the coarsest, the second keying mechanism (third and fourth keying elements 123, 124) is finer, while the third keying mechanism (fifth and sixth keying elements 125, 126) is the finest. It should be understood, however, that alternative embodiments are possible. For example, rather than having three keying mechanisms, additional or fewer keying mechanisms could be used. It should also be understood that in multiple keying mechanisms, only the final keying mechanism needs to be fine, the others may be equally coarse. In other words, the invention does not require varying levels of clearance among the different keying mechanism, provided that the keying of the ferrule is the tightest.

Referring back to the figures, the various connector components are considered in greater detail below. One function of the outer housing is to protect the inner housing and ferrule assembly. Additionally, in some embodiments, including that shown in FIGS. 7a and 7b, the outer housing also functions to mechanically interengaged the connector with a mating connector 150 (FIG. 1b). Of particular interest herein, are ruggedized connectors, comprising an outer housing which is configured to mate with the outer housing of a mating connector, typically through a screw connection. For example, in FIG. 1b, connector 100 has an outer housing which functions as a receptacle to receive the plug outer housing 151 of the mating connector 150. Aside from differences in the outer housings, connector 100 and mating connector 150 are essentially the same in this embodiment. Numerous United States Military specifications describe such multi-cavity connectors, including, for example, MIL-C-38999, ARINC 400 and ARINC 600, among others.

Figure 7A:
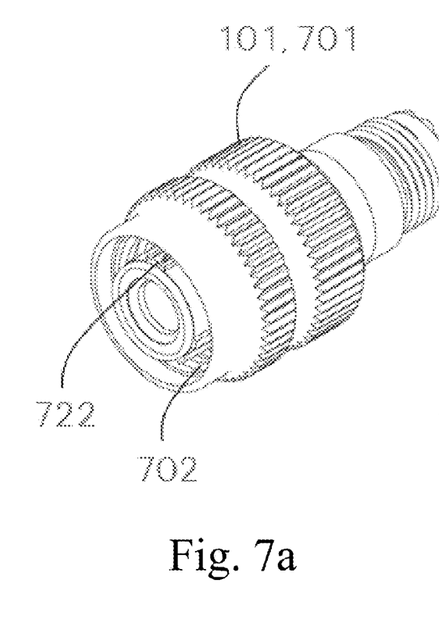
FIGS. 7a and 7b show one embodiment of the outer housings of a plug of the receptacle outer housing and the plug outer housing, respectively.
Figure 7B:
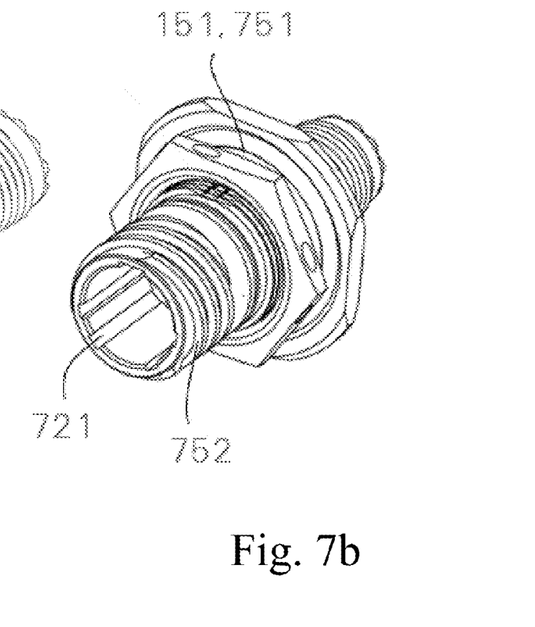

Referring to FIGS. 7a and 7b, a particular embodiment of the outer housings 101, 151 is shown. Shown is a 1Q1-38999, type III style, size 9 receptacle 701 and plug 751, respectively, with a quadrax size 8 cavity. This is a ruggedized connector typically used for electrical connectors. The outer housing provides a rigid structure that serves to align and secure the connector system during mating. Such housings have been used with success in practicing the present invention and with minimal modification from standard designs. Specifically, in one embodiment, there is a slight increase of quadrax through-hole diameter (compared to standard dimension) to accommodate the inner housing 102 described below. Noteworthy are the 38999 polarization connector keys 722 and keyways 721. These are used to orient the plug and receptacle shells relative to each other. In this embodiment, the receptacle 701 and plug 751 also have means for mechanically interengage, namely threads 702, 752.

Although an MIL-38999 receptacle and plug connectors are shown in FIGS. 7a and 7b, various embodiments of the outer housing are possible within the scope of the invention. For example, rather than having a plug and receptacle configuration, the outer housing may use an adapter to effect mechanical engagement with the mating connector. Likewise, the outer housings may be configured to abut a mating connector and may be held together by a clip or similar structure. It should also be understood that the outer housing may or may not be ruggedized. Furthermore, the outer housing may be configured to house just one inner housing 102, or it may be configured to house a plurality of inner housings. In yet another embodiment, the connector of the present invention does not have an outer housing, but rather relies only on the inner housings to effect a mechanical coupling. Still other embodiments will be obvious to one of skill in the art in light of this invention.

The inner housing serves to receive and hold the ferrule assembly and, in one embodiment, to facilitate biasing the ferrule assembly forward by providing a backstop for a spring 171. Referring to FIGS. 1a and 1b, the inner housing is disposed at least partially within the outer housing 101. In this particular embodiment, the ferrule assembly 103 is biased forward in the inner housing 102 by spring 171. This embodiment also shows the inner housing being held in the outer housing by a retainer 170. In one embodiment, the retainer is compliant, deflecting outward as the inner housing to be pushed forward into the outer housing until the retainer is free to spring inward behind the shoulder of inner housing 102 and urge against a rearward surface of the inner housing to retain the inner housing in the outer housing.

Although FIGS. 1a and 1b show the inner housing contained within the outer housing, it should be understood that other embodiments are possible, for example, the outer housing can hold two or more inner housings or the inner housing may be a standalone housing, not disposed within an outer housing.

The ferrule assembly serves to provide structure for holding the ferrule within the inner housing 102. Such ferrule assemblies are well known in the art. Although, in this particular embodiment, the ferrule assembly is augmented with a keying member 400 (see FIG. 4), as discussed below. The ferrule may be any known formed ferrule for holding PM fiber, including ceramic, metal or composite single or multi-fiber ferrules of any shape or size. Preferably, the ferrule assembly is a simple cylinder for ease of manufacturing and assembly. In the embodiment shown in FIGS. 1a and 1b, the ferrule is a cylindrical single-fiber, ceramic ferrule. Although the ferrules illustrated in FIGS. 1a and 1b have flat endfaces, it should be understood that the ferrule endfaces can be angled to reduce the return loss.

Figure 4:
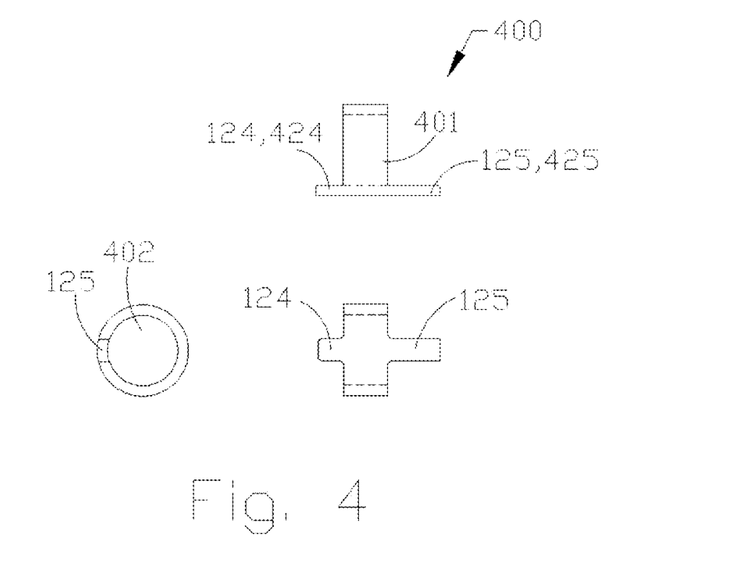
FIG. 4 shows one embodiment of the fourth and fifth keying elements shown in FIG. 1.
Figure 5:
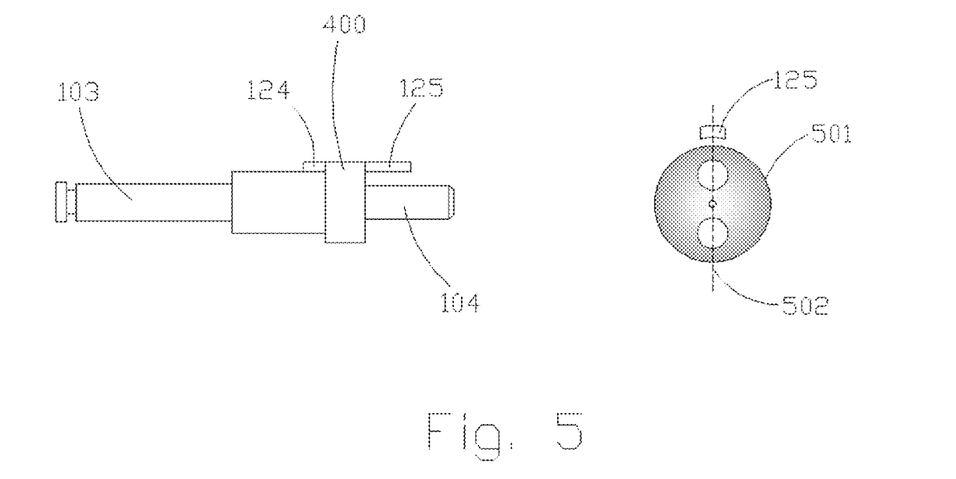
FIG. 5 shows the installation of the embodiment of FIG. 4 on a ferrule assembly.

Referring to FIG. 4, a keying member 400 is shown for attachment to the ferrule assembly 103 and 152 as shown in FIG. 1b. The keying member 400 comprises the fourth and fifth keying elements 124, 125, respectively, as well as a body 401 to facilitate attachment to the ferrule assembly. The fourth and fifth keying elements in this embodiment are both keys 424, 425. In this particular embodiment, the keying member is stamped and formed to high precision, although the keying member can also be machined, integrally molded or formed from discrete components—i.e., discrete fourth and fifth keying elements. As shown in FIG. 5, the body 401 is annular and defines a central opening 402 to receive the ferrule assembly 103. The keying member 400 is positioned such that it is precisely aligned with respect to the slow axis 502 of the PM fiber as shown in FIG. 5. This can be accomplished in different ways. For example, in one approach the PM fiber is terminated in the ferrule 104 and the end face of the ferrule is polished using known techniques. Next, the polished ferrule assembly 103 is inserted in the keying member 400 and keying member 125 is aligned with the slow fiber axis 502 (see FIG. 5). The keying member should be aligned with the birefringent axes of the fiber and not necessarily the geometrical axes as they may not always coincide. For that reason, it may not be sufficient to do a simple visual alignment under a microscope. To obtain better results, optical alignment may be preferred. This involves a "rotate & lock" process where polarized light is launched through the fiber which is affixed inside a continuously rotatable ferrule and while using polarizing components and a fixed mechanical reference orientation. When the desired orientation or PER level has been achieved, the ferrule is locked relative to the keying member. Still other approaches will be obvious to one of skill in the art in light of this disclosure.

It should be understood that precisely aligning the keying member 400 with respect to the ferrule 104 and the PM fiber 501 contained therein is critical to minimize the angular offset. In other words, the accuracy of the keying mechanism is only as accurate as the alignment of the keying member 400 to the fiber 501 and the slow axis 502. After completion of the alignment process, the keying member is permanently fixed to the plug and receptacle ferrule assemblies. The different ways in which the keying member can be fixed to the ferrule assembly including, for example, thermal or UV cured epoxy or an interference fit. By aligning the keying member for a specific ferrule containing a PM fiber, the ferrule assembly can "random mate" with repeatable performance.

Figure 6:
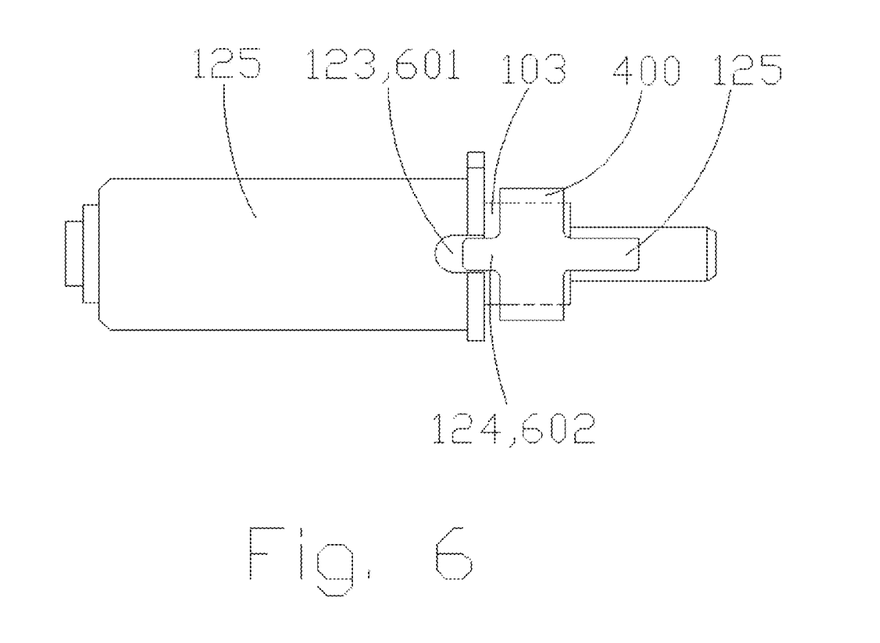
FIG. 6 shows the interengagement of the inner housing and the ferrule assembly of the embodiment of FIG. 1.

In the embodiment of the FIGS. 1a and 1b, the connector subassembly is assembled by inserting a spring 171 in the inner housing 102, and then inserting the ferrule assembly in the inner housing. Referring to FIG. 6, the interaction of the ferrule assembly 103 and the inner housing 102 is shown. Specifically, the second keying mechanism of the third key 123 and the fourth key 124 is shown. In this embodiment, the third keying element 123 is a keyway 601 which receives a key 602 of the keying member 400. A retainer clip is used to hold the ferrule assembly in the inner housing.

The alignment member 105 functions to precisely align the ferrule 104 such that it mates with a mating ferrule 154 having a similar keying mechanism such that there is little angular offset between the fibers' PM axis in the ferrules 104, 154. In the embodiment of FIGS. 1a and 1b, the alignment member 105 is disposed in the outer housing 151 which corresponds to the mating connector 150 or, in this particular embodiment, the plug connector. It should be understood, however, that the alignment member can be associated with either connector, 100, 150, or with a discrete component such as an adapter. For example, in one embodiment, the outer housing 101 is lengthened to include the alignment member 105, similar to the outer housing 151 illustrated in the FIG. 1a. In yet another embodiment, the alignment member is not contained in either outer housing 101, 151, but rather is contained in an intermediate adapter component (not shown). Still other embodiments will be obvious to one of skill in the art in light of this disclosure.

In one embodiment, the alignment member "floats" within the outer housing, thus enabling the member to adjust and accommodate the alignment of the ferrules. Accordingly, as is known in the art of floating alignment members, such as those used in adapters, there is generally some clearance between the alignment member and the ferrule diameter to allow the sleeve to control the alignment. In this way, the ceramic sleeve further serves the important function of aligning the optical axis of the cores of the mated fibers to reduce the insertion loss. In one embodiment, the alignment member is ceramic, although it may comprise other materials such as metal.

Figure 3:
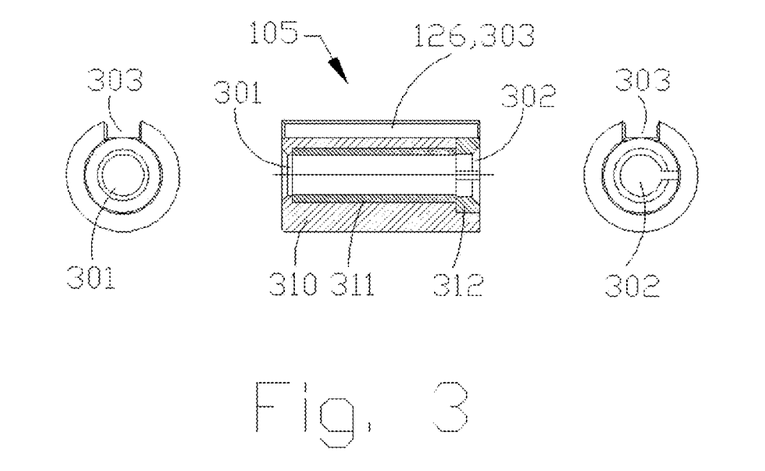
FIG. 3 shows one embodiment of the alignment member shown in FIG. 1.

Referring to FIG. 3, a detailed view of the alignment member 105 is shown in cross section, and from either end. As shown, the alignment member comprises a sixth keying element 126, which, in this embodiment, is a keyway 303. The alignment member also comprises first and second openings 301, 302 as shown in FIG. 3. The first ferrule 104 is received in opening 301, while the second ferrule 154 of the mating connector is received in the second opening 302. Thus, in this embodiment, the alignment member has one precision keyway throughout its length which is a shared keyway for the PM-keys of the plug and receptacle subassemblies. In this particular embodiment, the alignment member contains a precision ceramic alignment split sleeve 311 held within a body 310 by a retainer 312. The alignment member 105 is mounted permanently within the Quadrax cavity of the 38999 plug. In this embodiment, when the alignment member is disposed in the outer housing 151, the keyway 303 is 90 degree offset from the first and second keying elements.

As discussed above, the tight clearance of the PM-key/keyways determines the PER ratio—therefore it is advantageous to use a common keyway for both of the PM keys. In order to maintain a maximum allowable offset <1.8 degree (30 dB PER), the clearance of fifth and sixth keying elements should be less than 37 microns [0.0015 inch]— (assuming a perfect PM fiber axis-to-key alignment). For example, if the key 425 is in worst case offset position in the keyway slot 303, i.e. the offset from nominal of one is +37 um and the other is −37 um, a PER of 30 dB has been achieved.

As shown in FIG. 1, the alignment member 105 is a discrete component from the housing 151. Such a configuration allows the alignment member to be manufactured separately from the housing, thus facilitating the use of precision manufacturing techniques that may be superfluous for other portions of the housing. Nevertheless, in certain embodiments, it may be preferable for the alignment member 105 to be integral with the inner housing 152, 102 or outer housing 151, 101. In yet other embodiments, the alignment member 105 may be integrated with one of the ferrule assembly. Specifically, to the extent that the alignment member 105 is fixed in position relative to a ferrule assemblies, it may be integral, integrally molded, formed or otherwise secured to the ferrule assembly.

It should be understood that the foregoing is illustrative and not limiting and that obvious modifications may be made by those skilled in the art without departing from the spirit of the invention. Accordingly, the specification is intended to cover such alternatives, modifications, and equivalence as may be included within the spirit and scope of the invention as defined in the following claims.

What is claimed is:

1. A connector comprising:
    an outer housing having a first keying element;
    an inner housing at least partially disposed in said outer housing and having second and third keying elements, said second keying element cooperating with said first keying element to align angularly said inner housing with said outer housing;
    a ferrule assembly at least partially disposed in said inner housing and having a ferrule and fourth and fifth keying elements, said fourth keying element cooperating with said third keying element to align angularly said ferrule assembly with said inner housing;

an alignment member receiving at least a portion of said ferrule assembly, said alignment member having a sixth keying element to cooperate with said fifth keying element to align angularly said ferrule assembly with said alignment member; and wherein the clearance between said fifth and sixth keying elements is less than that between said first and second keying elements, and between said third and fourth keying elements.

2. The connector of claim 1, wherein said alignment member is elongated with a first and second opening on either end, and wherein said sixth keying element runs from said first opening to said second opening.

3. The connector of claim 2, wherein said ferrule of said ferrule assembly is received in said first opening and a second ferrule of a second ferrule assembly is received in said second opening.

4. The connector of claim 3, wherein said fifth keying element is a key and said sixth keying element is a keyway.

5. The connector of claim 4, wherein a fifth keying element of said second ferrule assembly engages said sixth keying element of said alignment member.

6. The connector of claim 1, wherein said fifth keying element is discrete and attached to said ferrule assembly.

7. The connector of claim 1, wherein said fourth keying element is a key and said third keying element is a keyway.

8. The connector of claim 1, wherein said fourth keying element is integral with said fifth keying element.

9. The connector of claim 8, wherein the clearance of said keyway of said third keying element is greater than that of said keyway of said sixth keying element.

10. The connector of claim 1, wherein said clearance is less between said third and fourth keying elements, than between said first and second keying elements.

11. The connector of claim 1, wherein said ferrule assembly is biased in said inner housing.

12. The connector of claim 1, wherein said alignment member is disposed in the outer housing.

13. The connector of claim 1, further comprising:
a second connector comprising:
a second outer housing having a seventh keying element;
a second inner housing at least partially disposed in said outer housing and having eighth and ninth keying elements, said eighth keying element cooperating with said seventh keying element to align angularly said second inner housing with said second outer housing;
a second ferrule assembly at least partially disposed in said second inner housing and having a second ferrule and ten and eleventh keying elements, said ten keying element cooperating with said ninth keying element to align angularly said second ferrule assembly with said second inner housing, and said eleventh keying element cooperating with said sixth keying element to align angularly said second ferrule in said alignment member.

14. The connector of claim 1, wherein said ferrule comprises a PM fiber.

15. The connector of claim 1, wherein said connector is a 38999 type connector.

16. The connector of claim 1, wherein said alignment member is disposed in said second outer housing.

17. A connector comprising:
a housing having a first keying element;
a ferrule assembly at least partially disposed in said housing, and comprising a ferrule and having second and third keying elements, said second keying element cooperating with said first keying element to align angularly said ferrule assembly with said housing;
an alignment member receiving at least a portion of said ferrule assembly, said alignment member having a fourth keying element to cooperate with said third keying element to align angularly said alignment member with said ferrule assembly; and
wherein the clearance between said third and fourth keying elements is less than that between said first and second keying elements.

18. The connector of claim 17, wherein said alignment member is elongated with a first and second opening on either end, and wherein said fourth keying element runs from said first opening to said second opening.

19. The connector of claim 18, wherein said ferrule of said ferrule assembly is received in said first opening and a second ferrule of a second ferrule assembly is received in said second opening.

20. The connector of claim 19, wherein said third keying element is a key and said fourth keying element is a keyway.

21. The connector of claim 20, wherein the clearance of said keyway of said first keying element is greater than the clearance of said keyway of said fourth keying element.

22. The connector of claim 17, wherein said ferrule assembly is biased in said inner housing.

23. The connector of claim 17, wherein said housing at least partially contains said alignment member.

\* \* \* \* \*